(12) United States Patent
Sao et al.

(10) Patent No.: US 11,971,346 B2
(45) Date of Patent: Apr. 30, 2024

(54) BIOLOGICAL SAMPLE DETECTION DEVICE

(71) Applicant: Hitachi High-Tech Corporation, Tokyo (JP)

(72) Inventors: Mayu Sao, Tokyo (JP); Nobuyoshi Shimane, Tokyo (JP); Fumiyasu Sato, Tokyo (JP); Tomoto Kawamura, Tokyo (JP)

(73) Assignee: HITACHI HIGH-TECH CORPORATION, Tokyo (JP)

( * ) Notice: Subject to any disclaimer, the term of this patent is extended or adjusted under 35 U.S.C. 154(b) by 434 days.

(21) Appl. No.: 17/421,450

(22) PCT Filed: Jan. 14, 2020

(86) PCT No.: PCT/JP2020/000904
§ 371 (c)(1),
(2) Date: Jul. 8, 2021

(87) PCT Pub. No.: WO2020/153177
PCT Pub. Date: Jul. 30, 2020

(65) Prior Publication Data
US 2022/0082492 A1   Mar. 17, 2022

(30) Foreign Application Priority Data

Jan. 25, 2019 (JP) .................... 2019-011216

(51) Int. Cl.
*G01N 21/27* (2006.01)
*G06T 7/11* (2017.01)
*G06T 7/90* (2017.01)

(52) U.S. Cl.
CPC ............. *G01N 21/27* (2013.01); *G06T 7/11* (2017.01); *G06T 7/90* (2017.01);
(Continued)

(58) Field of Classification Search
CPC .............. G01N 15/1463; G01N 2015/1465
See application file for complete search history.

(56) References Cited

U.S. PATENT DOCUMENTS 11,650,197 B2 *   5/2023   Kluckner ......... G01N 35/00732
                                                          702/21
2009/0324032 A1 * 12/2009   Chen ..................... G06T 7/0008
                                                          382/128
(Continued)

FOREIGN PATENT DOCUMENTS

EP          3553528 A1    10/2019
JP         200437322 A     2/2004
(Continued)

OTHER PUBLICATIONS

Search Report mailed Sep. 28, 2022 in European Application No. 20744988.5.
(Continued)

*Primary Examiner* — Wen W Huang
(74) *Attorney, Agent, or Firm* — Miles & Stockbridge, P.C.

(57) ABSTRACT

A biological sample detection device configured to acquire color information of an object of analysis without a deterioration in color extraction accuracy caused by incorrect extraction of color of a colored label and to measure the amount of liquid and determine the type of a sample, by analyzing the biological sample housed in a biological sample tube to which a colored label is attached, and determining whether or not a colored label is present on the biological sample tube; extracting the colored label determined to be present by the colored label presence determining process; removing the colored label from the color image and extracting a detection object region in the biological sample; and analyzing to acquire color information (Continued)

of the detection object region and analyze the liquid amount and the type of the biological sample.

13 Claims, 12 Drawing Sheets

(52) U.S. Cl.
CPC ............... *G06T 2207/10004* (2013.01); *G06T 2207/10024* (2013.01); *G06T 2207/30004* (2013.01)

(56) References Cited

U.S. PATENT DOCUMENTS

| | | | | |
|---|---|---|---|---|
| 2011/0102542 | A1* | 5/2011 | Chen | G06T 3/4038 348/37 |
| 2013/0343515 | A1* | 12/2013 | Besson | G01N 23/04 378/19 |
| 2016/0025756 | A1* | 1/2016 | Pollack | G01N 35/00603 422/65 |
| 2016/0109350 | A1 | 4/2016 | Esaki et al. | |
| 2016/0266157 | A1 | 9/2016 | Suzuki et al. | |

FOREIGN PATENT DOCUMENTS

| | | |
|---|---|---|
| JP | 2015040696 A | 3/2015 |
| JP | 20168927 A | 1/2016 |
| JP | 201896740 A | 6/2018 |
| WO | 2015072358 A1 | 5/2015 |

OTHER PUBLICATIONS

Search Report mailed Mar. 17, 2020 in International Application No. PCT/JP2020/000904.
Written Opinion mailed Mar. 17, 2020 in International Application No. PCT/JP2020/000904.

* cited by examiner

FIG. 6A
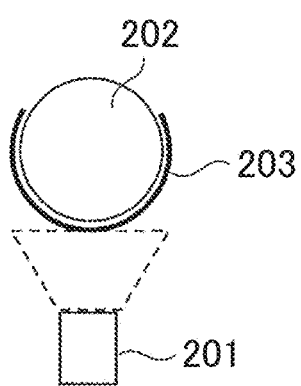
FIG. 6B
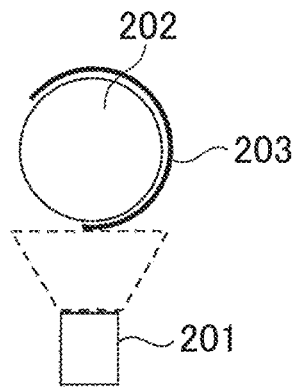
FIG. 6C
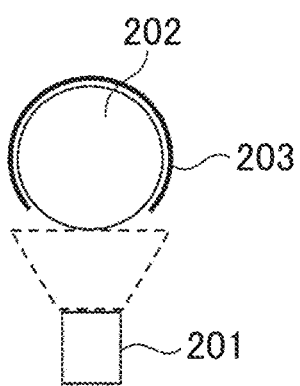
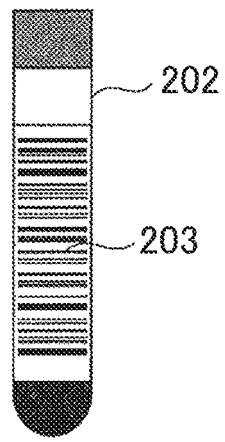
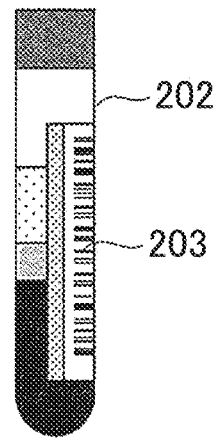
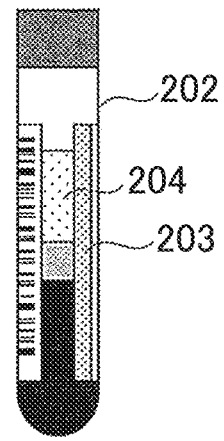

LONG-SIDE DIRECTION

ROI

FIG.10
ROI TO BE ANALYZED(EXAMPLE)   ROI NOT TO BE ANALYZED (EXAMPLE)
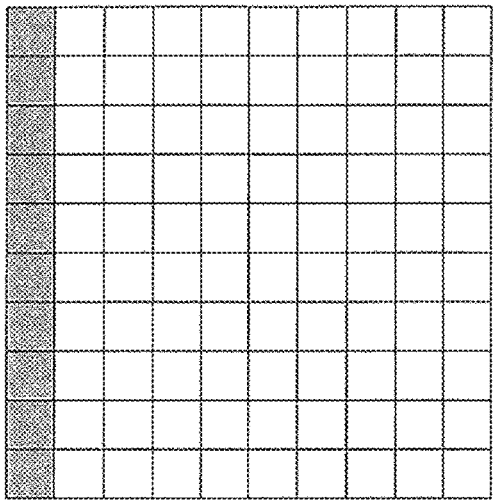 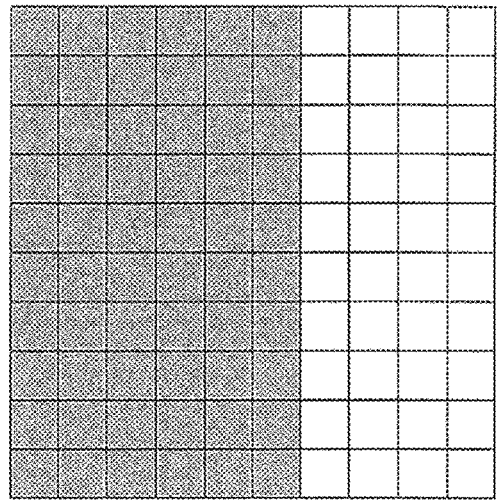

FIG.12
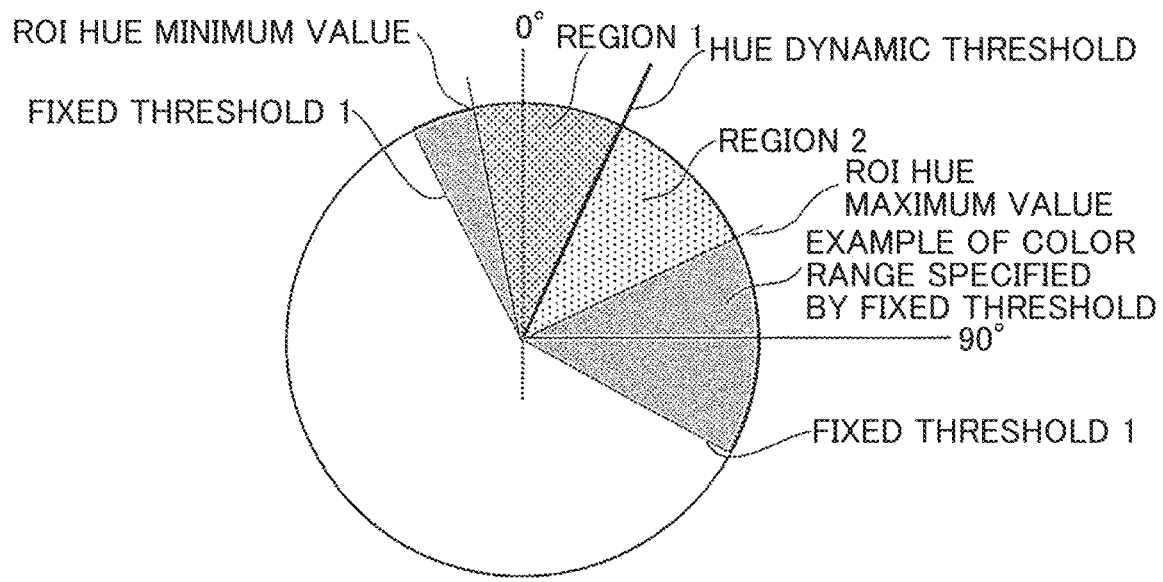
FIG. 13A  FIG. 13B  FIG. 13C
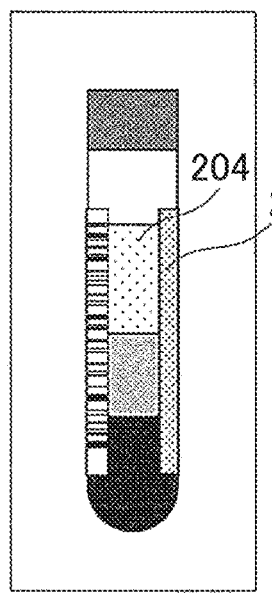 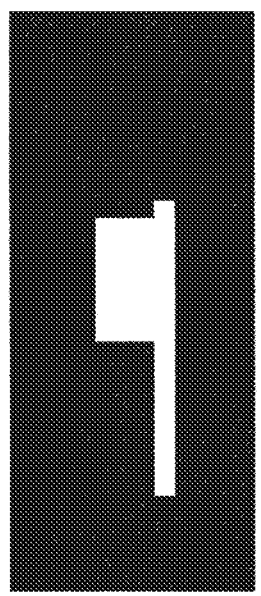 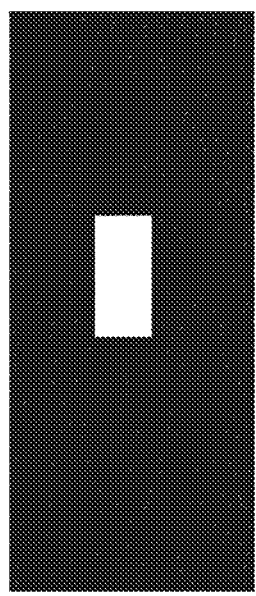

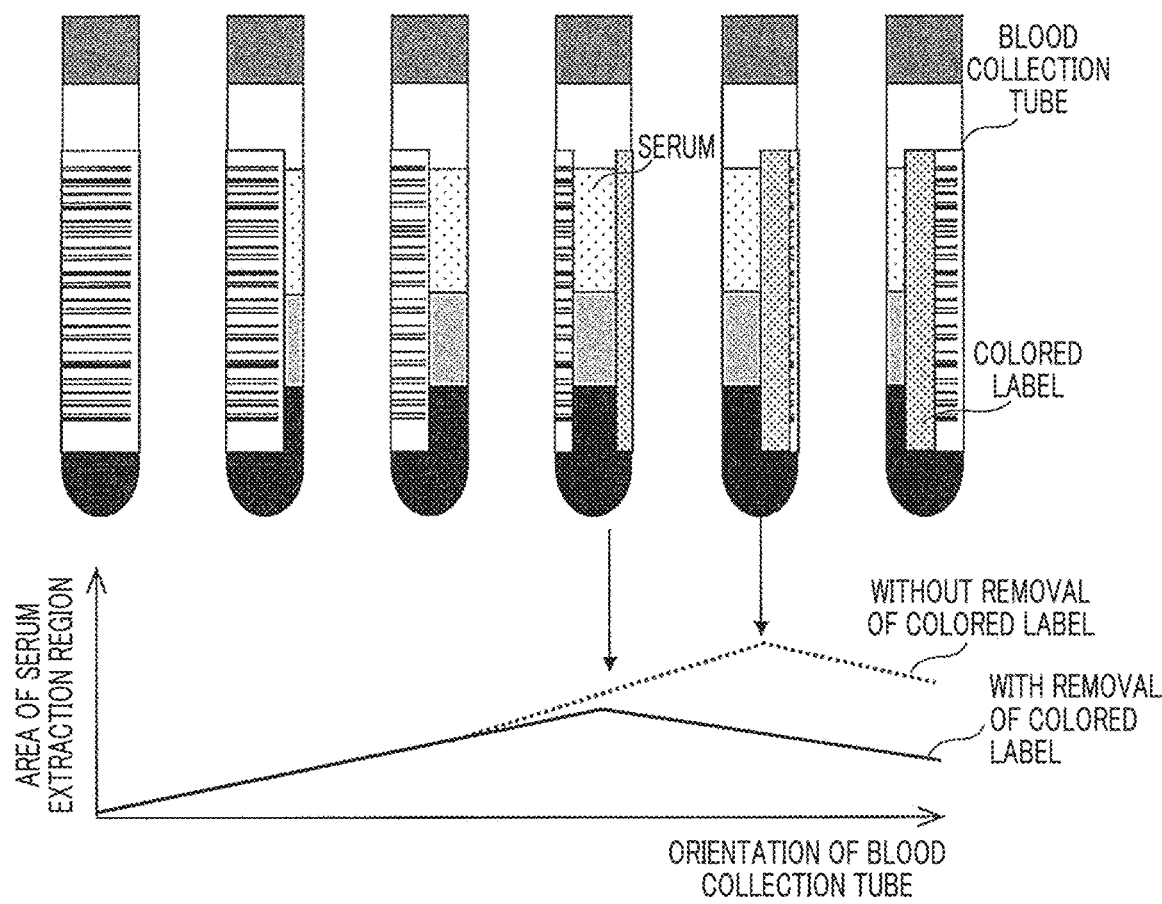

BIOLOGICAL SAMPLE DETECTION DEVICE

TECHNICAL FIELD

The present disclosure relates to a biological sample detection device which, for a biological sample comprised of a plurality of components, detects the colors and amounts of the components.

BACKGROUND ART

There are proposed techniques to automate a sample check before biochemical analysis with the aim of improving the efficiency in clinical inspection such as a blood test. In a sample check, it is necessary to measure the liquid amount and determine the sample condition such as serum type (normal, hemolysis, icterus, chyle, etc.), which have been formerly performed by visual inspection.

As a technique to determine the sample condition, for example, Patent Literature 1 discloses a detection device which detects information of a biological sample in a biological sample tube to which a label is attached. More specifically, the detection device includes: an imaging section which takes an image of a biological sample tube; a detection object region extracting section which extracts a detection object region from the image taken by the imaging section; a label extracting section which extracts the label positioned on the imaging surface side of the imaging section, from the image taken by the imaging section; and an analyzing section which identifies the boundary position of the label in the detection object region extracted by the detection object region extracting section according to the boundary position of the label extracted by the label extracting section, in order to measure the liquid amount and acquire information on the sample type from color information of the detection object region extracted from the image of the sample.

Furthermore, for example, Patent Literature 2 discloses a liquid detection device which irradiates a blood collection tube with infrared light to detect transmitted light and calculates a label boundary on the basis of a first derivation value thereof to estimate the amount of serum in the blood collection tube.

CITATION LIST

Patent Literature

PTL 1: Japanese Patent Application Laid-Open No. 2016-8927

PTL 2: Japanese Patent Application Laid-Open No. 2004-37322

SUMMARY OF INVENTION

Technical Problem

The technique disclosed by Patent Literature 1 concerns a method which extracts the color information of the detection object region by identifying the boundary position of the label in the detection object region extracted according to the boundary position of the extracted label.

However, Patent Literature 1 has a problem that for a sample to which a colored label similar to the color of a detection object is attached, no consideration is given to discrimination between the color of the colored label and the color of the detection object region and separation of the colored label region and the detection object region and thus the color of the colored label might be mistakenly extracted, leading to deterioration in color extraction accuracy.

In addition, according to Patent Literature 2, the boundary of the label is detected and the amount of serum is measured, but the color information of an object of analysis is not acquired to determine the sample type.

The present disclosure has been made in view of these circumstances and proposes a technique which can acquire the color information of an analysis object region without deterioration in the accuracy of extraction of the analysis object region caused by wrong extraction of the color of a colored label and measure the liquid amount of a sample and determine the sample type.

Solution to Problem

In order to solve the above problem, the present disclosure proposes a biological sample detection device which analyzes a biological sample housed in a biological sample tube to which a colored label is attached. The device comprises: an imaging device which takes and outputs a color image of the biological sample tube; a storage device which stores a program to perform prescribed image processing on the color image; and a processor which reads the program from the storage device and performs the prescribed image processing. The processor performs: a colored label presence determining process to determine whether or not a colored label is present on the biological sample tube, according to color information of the color image; a label extracting process to extract the colored label determined to be present by the colored label presence determining process, from the color image; a detection object region extracting process to remove the colored label from the color image and extract a detection object region in the biological sample; and an analyzing process to acquire color information of the detection object region and perform measurement of the liquid amount and classification of the biological sample by type.

The further features of the present disclosure will more fully appear from the following description in this specification and the accompanying drawings. The aspects of the present disclosure are achieved and realized by elements and combination of various elements and the following detailed description and appended claims.

It should be understood that the description in this specification merely describes a typical example and does not limit the claims of the present disclosure or application examples in any sense.

Advantageous Effects of Invention

According to the present disclosure, in a sample to which a colored label is attached, the color and amount of the sample comprised of a plurality of components can be detected with high accuracy.

BRIEF DESCRIPTION OF DRAWINGS

FIGS. 6A-6C are diagrams which show the positional relation between the position of the attached colored label 203 of the biological sample tube 202 and the imaging section 201.

FIG. 10 is a diagram which shows the difference between a region of interest to be analyzed and a region of interest not to be analyzed.

FIG. 12 is a diagram which shows hue distribution in the region of interest of each image.

FIGS. 13A-13C are diagrams which show an example of the detection object region 204 extracting mask (serum region extracting mask).

FIGS. 14A-14G are diagrams which show the relation between the imaging direction of the blood collection tube (biological sample tube 202) and the serum extraction region area (detection object region 204 area).

DESCRIPTION OF EMBODIMENTS

Figure 1:
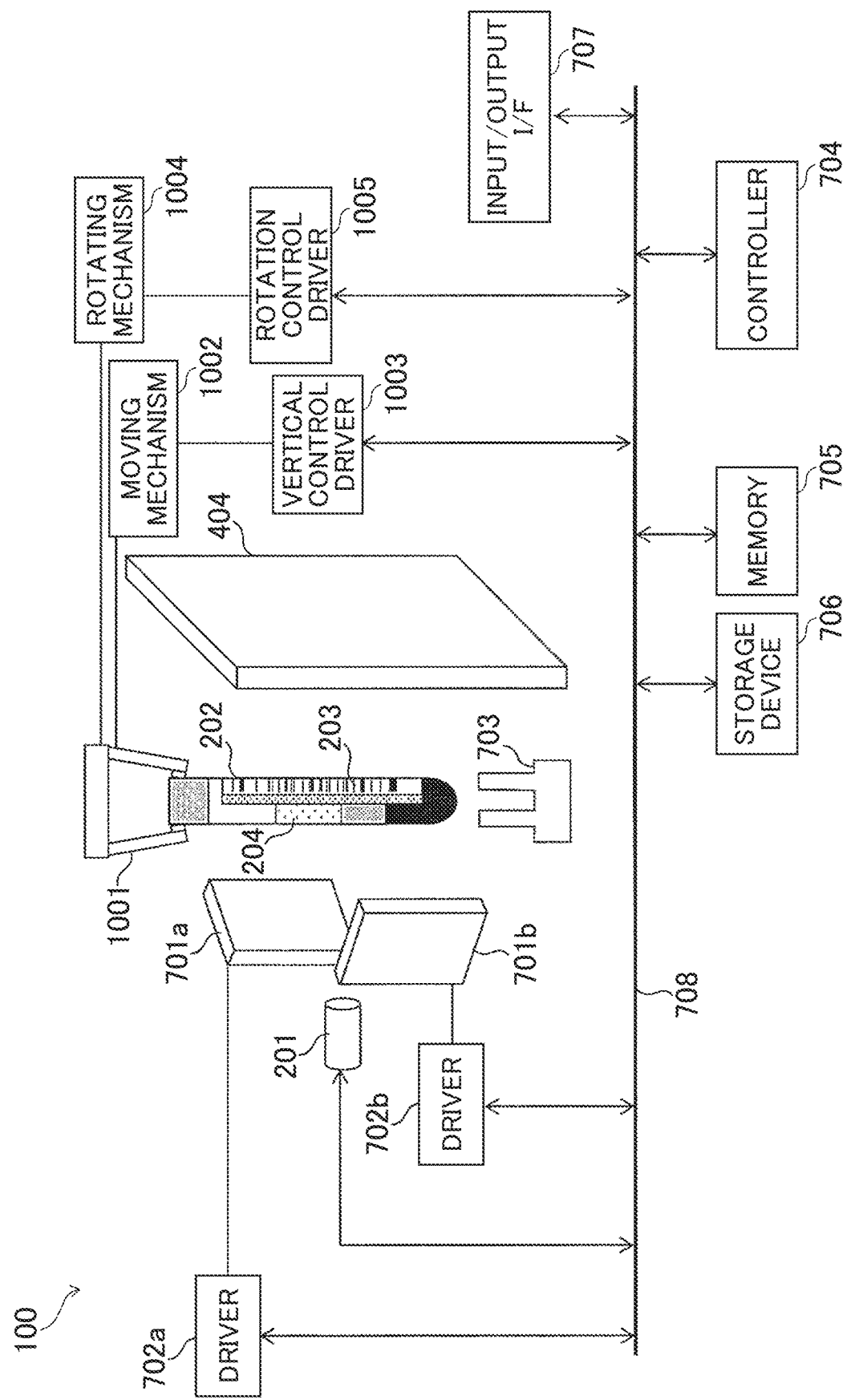
FIG. 1 is a diagram which shows an example of the general configuration of a biological sample detection device 100 according to this embodiment.

Hereinafter, an embodiment of the present invention will be described referring to the accompanying drawings. In the accompanying drawings, the functionally same elements may be designated by the same reference numerals. Although the accompanying drawings show concrete embodiments and examples of implementation which are in accordance with the principle of the present disclosure, these are intended for understanding of the present disclosure and should never be used to interpret the present disclosure in a limited way.

In this embodiment, an explanation thereof is made in a sufficiently detailed way to enable a person skilled in the art to embody the present disclosure, but another implementation or embodiment is also possible. It should be understood that changes in composition/structure or replacement of various elements can be made without departing from the scope and spirit of the technical idea of the present disclosure. Therefore, the description given below should not be interpreted as being limitative.

In this embodiment, descriptions will be made separately in several sections or as several embodiments as necessary, but such descriptions are not irrelevant to each other unless otherwise specified. One description may be, in whole or in part, a modified, detailed or supplementary form of another. Also, when a specific number (the number of pieces, numerical value, quantity, range, etc.) is indicated for an element, it is not limited to the specific number unless otherwise specified or theoretically limited to the specific number and it may be larger or smaller than the specific number.

In the embodiment described below, it is needless to say that constituent elements (including constituent steps) are not necessarily essential unless otherwise specified or apparently considered as theoretically essential.

Similarly, in the embodiment described below, when a specific form or positional relation is indicated for an element or the like, it should be interpreted to include a form or the like which is virtually approximate or similar to the specific form or the like unless otherwise specified or apparently considered as theoretically so. The same can be said of the numerical value and range as mentioned above.

Also, in all the drawings that illustrate the embodiment, basically the same elements are designated by the same reference signs and repeated descriptions thereof may be omitted.

<Configuration of the Biological Sample Detection Device>

FIG. 1 is a diagram which shows an example of the general configuration of a biological sample detection device 100 according to this embodiment. As shown in FIG. 1, the biological sample detection device 100 includes an imaging section 201, a background plate 404, light sources 701a and 701b, light source drivers 702a and 702b, a biological sample tube holder 703, a controller 704, a memory 705, a storage device 706, an input/output interface 707, a data bus 708, a gripping mechanism 1001, a moving mechanism 1002, a vertical control driver 1003, a rotating mechanism 1004, and a rotation control driver 1005.

The controller 704 is constituted, for example, by a processor (CPU or MPU) and reads various programs stored in the memory 705 or storage device 706 and runs them in an internal memory (not shown) to generate an image processing section and a region-of-interest setting section, which will be described later, and executes them at prescribed timings (according to the flowchart described later (FIG. 5, etc.)).

The input/output interface 707 is comprised of a keyboard, a touch panel, a microphone, switches, a display unit, a printer, a speaker and so on and used to show the type and amount of a biological sample which have been detected. Also, the input/output interface 707 receives a set value for the after-mentioned region of interest (ROI) and input of parameters used for data transfer, the biological sample type and/or biological sample amount and the like.

The gripping mechanism 1001 grips the biological sample tube 202 installed in the biological sample tube holder 703.

The vertical control driver 1003 moves the gripping mechanism 1001 vertically by controlling the moving mechanism 1002.

Here, the biological sample tube holder 703 is transported by a transport line and stopped by a stopping mechanism (not shown). The moving mechanism 1002 moves the biological sample tube 202 gripped by the gripping mechanism 1001 until the whole biological sample tube 202 comes to a position for imaging by the imaging section 201. As the gripping mechanism 1001 moves the biological sample tube 202 upward, the whole biological sample tube 202 is irradiated with light from the light source 701b. More specifically, the biological sample tube 202 as the object of analysis which has been installed in the biological sample tube holder 703 is gripped by the gripping mechanism 1001 and moved into the visual field of the imaging section 201 by the moving mechanism 1002. At this time, the vertical control driver 1003 adjusts the vertical position of the biological sample tube 202 by controlling the amount of movement of the moving mechanism 1002. Here, the imaging section 201 has to take an image of at least a detection object region 204 of the biological sample tube 202. Therefore, the vertical control driver 1003 determines the amount of movement of the moving mechanism 1002 depending on the length of the biological sample tube 202 so that regardless of the length of the biological sample tube 202, the detection object region 204 can be irradiated with light from the light source 701b and can be moved into the visual field of the imaging section 201 for imaging.

The rotation control driver 1005 rotates the biological sample tube 202 gripped by the gripping mechanism 1001 by controlling the rotating mechanism 1004. The rotating mechanism 1004 changes the positional relation between the colored label 203 attached to the biological sample tube 202 and the imaging section 201 by rotating the biological sample tube 202 gripped by the gripping mechanism 1001. As the rotating mechanism 1004 changes the positional relation between the label attached to the biological sample tube 202 (colored label) 203 and the imaging section 201, the imaging section 201 can take an image of the biological sample tube 202 along its whole circumference.

The imaging section 201 is constituted, for example, by an imaging device such as a CCD (Charge Coupled Device) image sensor or CMOS (Complementary Metal-Oxide Semiconductor) image sensor. The imaging section 201 takes a two-dimensional color image of the biological sample tube 202 irradiated by the light sources 701a and 701b against the background plate 404 and sends it to the controller 704 (image processing section 210). Here, by using light from the light sources 701a and 701b rather than natural light and using the background plate 404, even if the color of the detection object region 204 is transparent, for example, like serum, variation in the color of the detection object region 204 extracted for analysis among measurements and variation due to the influence of external light can be reduced, leading to improvement in the analysis accuracy.

In addition, the light sources 701a and 701b are constituted, for example, by white LEDs and controlled by the light source drivers 702a and 702b. Here, the luminance of the light sources 701a and 701b influences the color of the color image of the biological sample tube 202. If the luminance of the light sources varies, the analysis result of the same biological sample tube 202 will vary. For this reason, by performing calibration to adjust the light of the light sources 701a and 701b before measurement, using an image taken of a discoloration-free proofreading jig or the result of extraction of the color of the background image for the biological sample tube 202, measurement can be made always under the same lighting condition so that the analysis accuracy is improved.

The color image acquired as mentioned above is used by the controller 704 (image processing section 210) for image processing and analysis processing which will be described later, and the color and amount of the detection object region 204 are calculated (detected). The memory 705 or storage device 706 stores, for example, the amount of serum color characteristic which is needed to analyze the color of the detection object region 204. Information such as the color information of the detection object region 204 and analysis results is transferred to the controller 704 through the data bus 708 and outputted from the input/output interface 707 (for example, it is displayed on the display screen of the display unit).

<Functions to be Performed Inside the Controller 704>

Figure 2:
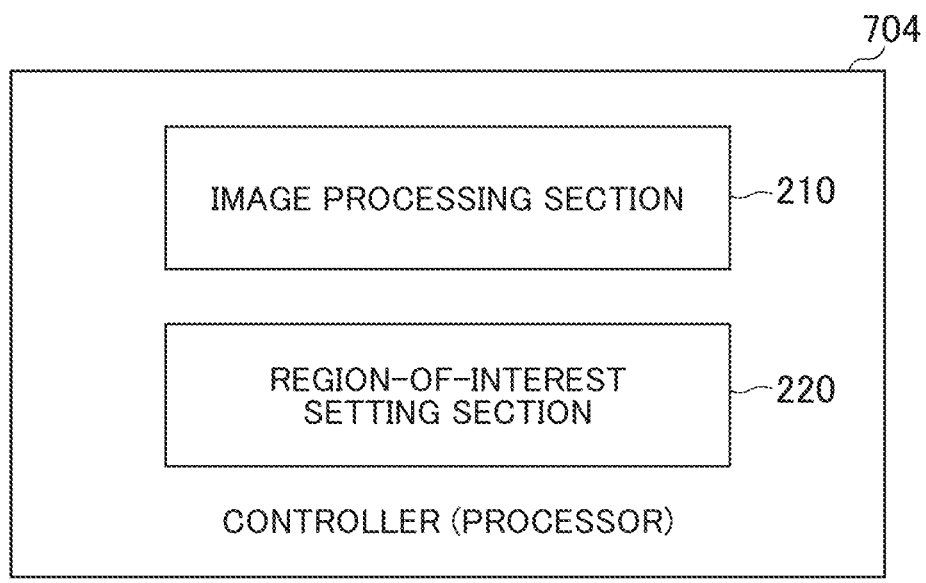
FIG. 2 is a diagram which shows the general function which is performed when the program stored in the memory 705 or storage device 706 is run inside the controller (processor) 704.

FIG. 2 is a diagram which shows the general function which is performed when the program stored in the memory 705 or storage device 706 is run inside the controller (processor) 704. As shown in FIG. 2, the controller 704 has an image processing section 210 and a region-of-interest setting section 220 as functions to be performed by software.

The image processing section 210 performs processing to extract a detection object region 204 (for example, a serum region) from a plurality of images taken by the imaging section 201, identify the color of the object of detection and the type of the sample and calculate the amount of solution.

The region-of-interest setting section 220 is a processing section which performs the function to enable the user (operator) to set or change the region of interest (ROI) which will be described later. For example, if the user specifies the number of ROIs, reference coordinate values of each ROI in the captured image, region size, pitch and so on using the touch panel as the input/output interface 707, the region-of-interest setting section 220 sets a plurality of ROIs (for example, in the long-side direction and/or short-side direction of the biological sample tube 202) for the object image. In addition, when a setting file which describes the number of ROIs, reference coordinate values of each ROI in the captured image, region size, pitch and so on is stored in the memory 705 or storage device 706, an ROI can be set or changed by reading the information of the setting file from the program. From the region of interest set for each of the images, pixel information (the number of pixels in the ROI, RGB values, hue value, saturation value, brightness value, etc.) is acquired. Furthermore, in response to an instruction entered by the user (operator), the region-of-interest setting section 220 may perform processing to change the number of regions of interest in the long-side direction and/or short-side direction or change the size of a region of interest.

<Internal Configuration of the Image Processing Section>

Figure 3:
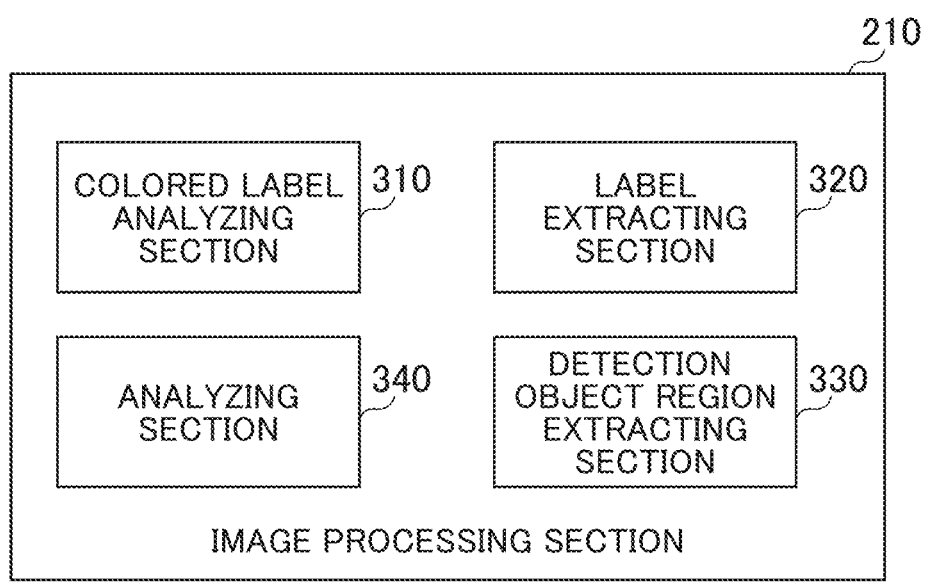
FIG. 3 is a diagram which shows an example of the internal configuration of the image processing section 210.

FIG. 3 is a diagram which shows an example of the internal configuration of the image processing section 210. As shown in FIG. 3, the image processing section 210 includes a colored label analyzing section 310, a label extracting section 320, a detection object region extracting section 330, and an analyzing section 340. Though operation of each processing section will be detailed later (FIG. 7, etc.), the processing which is performed by each section is summarized as follows.

The colored label analyzing section 310 performs colored label analyzing processes 1 and 2. Though each process will be detailed later, the colored label analyzing process 1 is a process in which the region of interest as the object of analysis is extracted from a plurality of regions of interest set by the region-of-interest setting section 220, whether a colored label (for example, if the detection object is serum, a label in the hue range from yellow to red similar to the serum color) is present or not is determined based on the color information (RGB values, hue value, saturation value, brightness value, etc.) of the region of interest of the analysis object, and if present, the colored label region is removed from the color image of the biological sample tube 202 to generate a mask to extract the detection object region 204 (detection object region 204 extracting mask). The colored label analyzing process 2 is a process to extract a colored label region of a label of a color out of the yellow-to-red hue range (for example, blue or green label).

The label extracting section 320 performs the process to extract the colored label region from the color image of the biological sample tube 202 using the detection object region 204 extracting mask generated by the colored label analyzing section 310.

The detection object region extracting section 330 performs the process to extract the detection object region 204 (for example, a serum region) from the color image of the biological sample tube 202, using the detection object region 204 extracting mask generated by the colored label analyzing section 310.

The analyzing section 340 performs the process to identify the color of the detection object region 204 extracted by the detection object region extracting section 330 and determine the type of the biological sample from the information on that color and the process to calculate the liquid amount of the biological sample from the detection object region 204 extracted by the detection object region extracting section 330.

<Example of the Internal Configuration of the Colored Label Analyzing Section>

Figure 4:
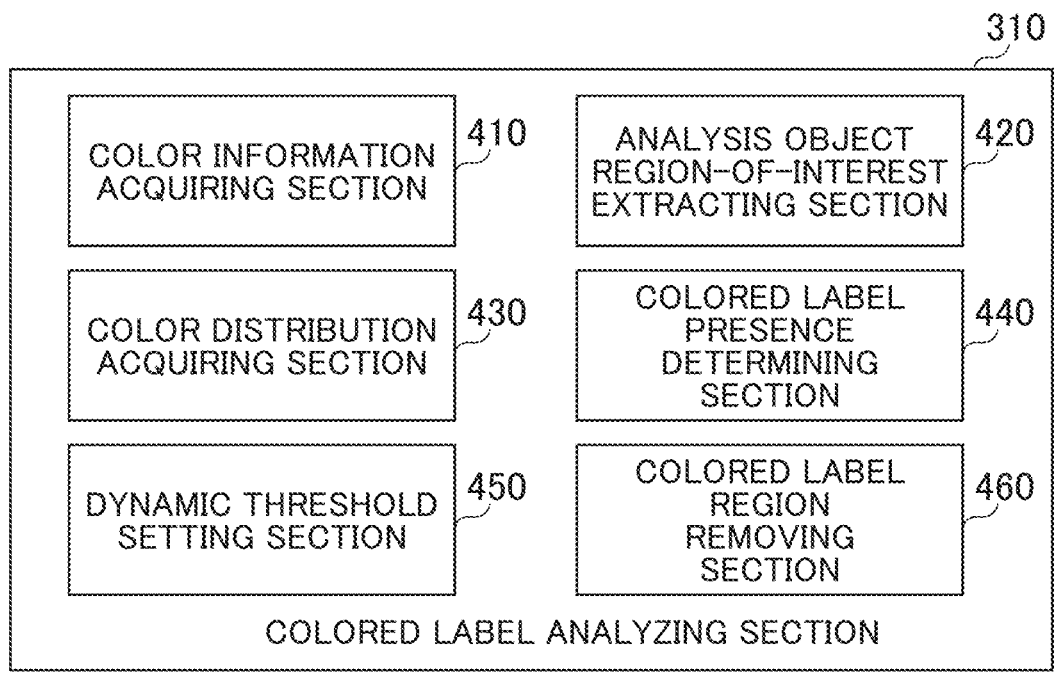
FIG. 4 is a diagram which shows an example of the internal configuration of the colored label analyzing section 310.

FIG. 4 is a diagram which shows an example of the internal configuration of the colored label analyzing section 310. As shown in FIG. 4, the colored label analyzing section 310 includes a color information acquiring section 410, an analysis object region-of-interest extracting section 420, a color distribution acquiring section 430, a colored label presence determining section 440, a dynamic threshold setting section 450, and a colored label region removing section 460. Though operation of each processing section will be detailed later (FIG. 7, etc.), processing which is performed by each section is summarized as follows.

The color information acquiring section 410 performs the process to acquire information on the hue (H), saturation (S), and brightness (V: Value) of each region of interest as set by the region-of-interest setting section 220 from the data of the image taken by imaging.

The analysis object region-of-interest extracting section 420 performs the process to extract the region of interest as the object of analysis from among a plurality of regions of interest as set by the region-of-interest setting section 220 according to the color information (HSV value) of each region of interest as acquired by the color information acquiring section 410 (narrow down to the region of interest for use in analysis from a plurality of regions of interest).

Figure 11A:
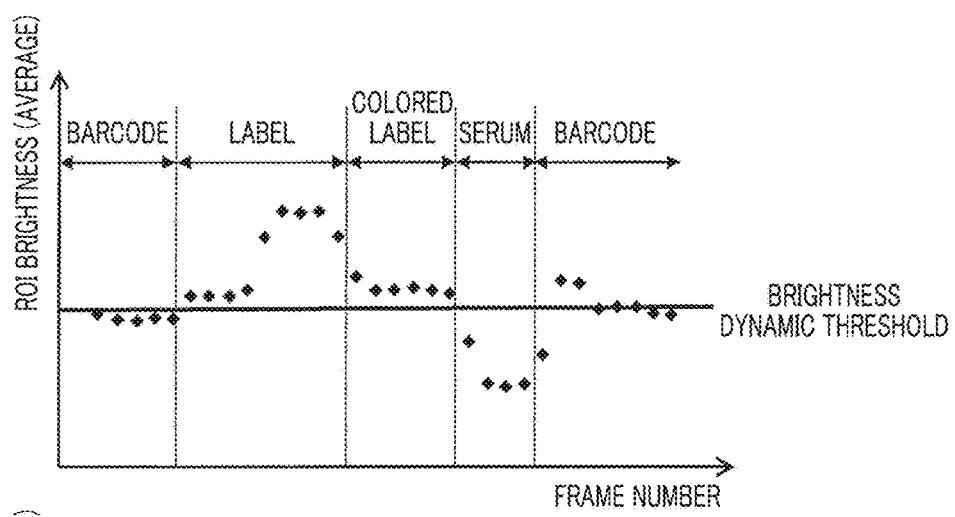
FIGS. 11A-11B show distribution of average brightness values in the region of interest of each image.
Figure 11B:
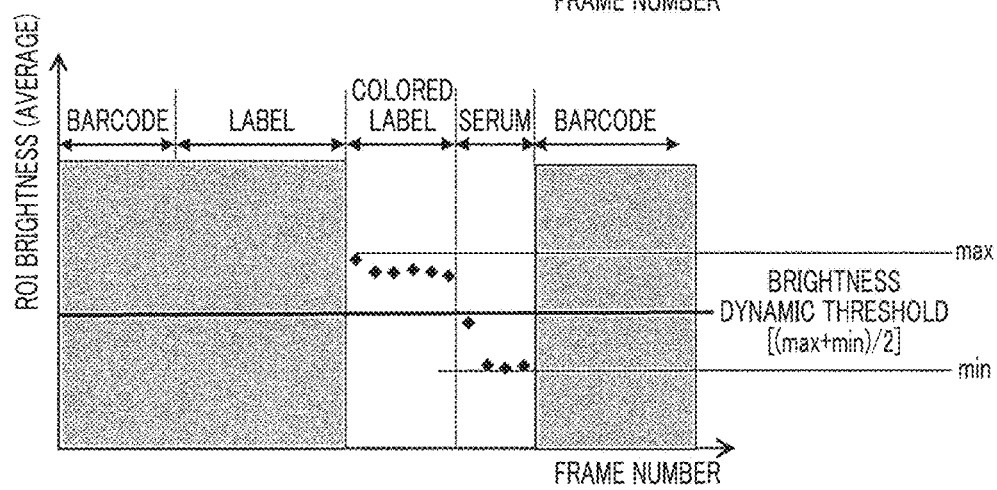

The color distribution acquiring section 430 performs the process to generate a color distribution of the region of interest as the object of analysis as extracted by the analysis object region-of-interest extracting section 420 (for example, see FIGS. 11A and 11B).

The colored label presence determining section 440 performs the process to determine whether a colored label (for example, a color included in a prescribed color range (hue and brightness): yellow to red, or the like) is present or not, according to the color distribution generated by the color distribution acquiring section 430. If the colored label presence determining section 440 determines that a colored label of a color included in the prescribed color range such as yellow to red is not present, it performs the process to determine whether a colored label out of the prescribed color range is present or not.

For example, if it is determined that a colored label of a color included in the prescribed color range such as yellow to red is present, the dynamic threshold setting section 450 performs the process to dynamically calculate the threshold for brightness (brightness dynamic threshold) and the threshold for hue (hue dynamic threshold) from the color distribution of the above region of interest as the object of analysis. In addition, the dynamic threshold setting section 450 performs the process to dynamically set the threshold for saturation (saturation dynamic threshold) according to the saturation information of the region of interest as the object of analysis (average saturation value or minimum or maximum saturation value).

The colored label region removing section 460 performs the process to generate a detection object region 204 extracting mask using the dynamic threshold set by the dynamic threshold setting section 450 and remove the colored label from the image as the object of analysis (best frame which will be described later).

<Outline of the Biological Sample Analyzing Process>

Figure 5:
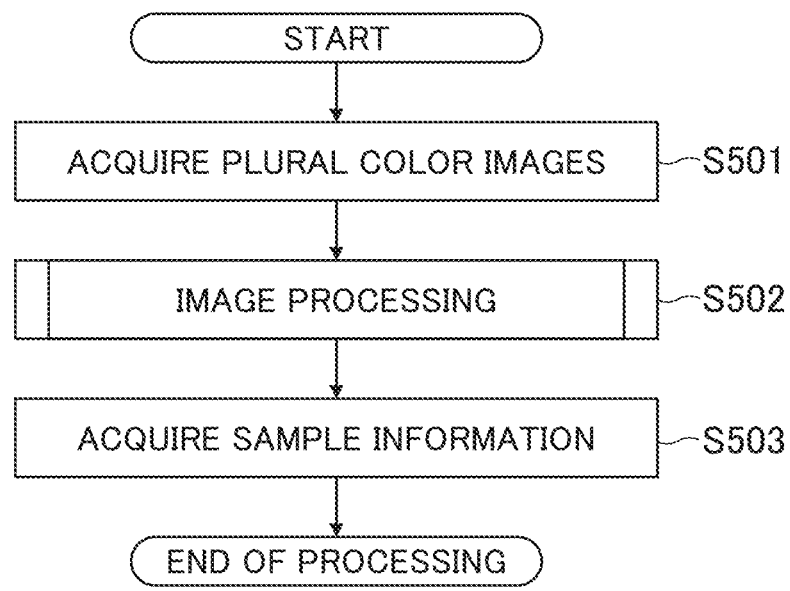
FIG. 5 is a flowchart which explains the outline of the biological sample analyzing process which is performed by the biological sample detection device 100 according to this embodiment.

FIG. 5 is a flowchart which explains the outline of the biological sample analyzing process which is performed by the biological sample detection device 100 according to this embodiment. In the explanation below, the subject of action for each step is assumed to be the processing section corresponding to the step. However, since each processing section is implemented by a program stored in the memory 705 or storage device 706, instead it may be interpreted that the subject of action for each step is the controller (processor) 704 as the subject which executes the program. According to the biological sample analyzing process in this embodiment, even when the colored label 203 is attached to the biological sample tube 202, an image of the detection object region 204 can be taken to acquire a two-dimensional color image so that the color and amount of the detection object region 204 can be analyzed in the image processing section 210. Furthermore, in the biological sample tube 202 to which the colored label 203 is attached, wrong extraction of the colored label 203 of a color similar to the detection object region 204 as part of the detection object region 204 is avoided, so that the accuracy in the analysis of the color and amount of the detection object region 204 is improved.

(i) Step 501

The image processing section 210 acquires a plurality of color images (including position information and HSV value of each pixel of each image, etc.) of the biological sample tube 202 which have been taken by the imaging section 201. Here, the method of taking an image of the biological sample tube 202 is explained. FIGS. 6A-6C are diagrams which show the positional relation between the position of the colored label 203 attached to the biological sample tube 202 and the imaging section 201. In order to analyze the color and amount of the detection object region 204 from a color image of the biological sample tube 202 to which the colored label 203 is attached, not a color image of a barcode portion as shown in FIG. 6A but a color image of a region including the detection object region 204 exposed through the gap of the colored label 203 as shown in FIG. 6B and FIG. 6C is required. In addition, in order to analyze the color of the detection object region 204 and the color of the colored label 203 of a color similar to the color of the detection object region 204 and extract only the color of the detection object region 204, a color image including the colored label region as shown in FIG. 6B is also required. Therefore, it is necessary to acquire both a color image of the detection object region 204 and a color image of the colored label region in the same biological sample tube 202 as shown in FIG. 6B and FIG. 6C by rotating the biological sample tube 202.

Therefore, the rotating mechanism 1004 and the rotation control driver 1005 control the rotation of the biological sample tube 202 according to an instruction from the controller 704, so that a plurality of color images are taken while the biological sample tube 202 is rotated. For example, the rotating mechanism 1004 rotates the biological sample tube 202 and the rotation control driver 1005 controls the rotation speed or acceleration speed, rotation angle, rotation rate, rest time after rotation and rotation start timing. By synchronizing the image capturing timing of the imaging section 201 with the rest time after rotation and rotation start timing, an image of the biological sample tube 202 which is still and in focus can be taken. For example, by repeating the cycle of rotation by 10 degrees and rest, 36 still images (36 frames) can be taken. The rotation angle and rotation speed or acceleration speed need not be constant. For example, the speed between the first frame and second frame may be increased from low speed and the speed between the thirty-first frame and thirty-second frame may be decreased to take images covering the whole circumference of the biological sample tube 202 with a total of 32 frames. Thus, by rotating the biological sample tube 202, an image can be taken with the detection object region 204 facing the front of the imaging section 201. In addition, when putting the biological sample tube 202 in the biological sample detection device 100, the user (operator) need not adjust its orientation, thereby improving the analysis efficiency.

(ii) Step 502

The image processing section 210 performs image processing in each of the colored label analyzing section 310, label extracting section 320, and detection object region extracting section 330 (details of which will be described later) and extracts the detection object region 204 from the color image acquired at Step 501.

For example, the colored label analyzing section 310 detects the color of the colored label 203 attached to the biological sample tube 202 from the received color image of the biological sample tube 202. The label extracting section 320 extracts the colored label detected by the colored label analyzing section 310. The detection object region extracting section 330 extracts only the detection object region 204. Details of the process at Step 502 (image processing) will be described later (see FIG. 7).

(iii) Step 503

The image processing section 210 performs processing by the analyzing section 340 and acquires information such as the color and amount of the object of detection as acquired in the detection object region 204 (by calculation). For example, when the color information for each type of biological sample is previously stored in the memory 705 or storage device 706 and the analyzing section 340 checks the acquired color information with the color information previously stored in the memory 705 or the like, the type of the biological sample can be determined from the color information of the detection object region 204. For example, if the detection object region 204 is a serum, the serum color has a characteristic depending on the serum condition (normal, hemolysis, icterus, chyle). For this reason, by storing the amount of color characteristic, the range and threshold of the color space for use in classification in the memory 705 or the like and checking the color information acquired by the analyzing section 340 with them, the serum condition of the sample can be determined. In addition, the amount of the solution as the object of detection can be calculated from the information on the number of pixels in the height direction of the detection object region 204 (vertical direction of the color image) and the information on the diameter of the biological sample tube 202. The diameter of the biological sample tube 202 is acquired, for example, by the user directly entering such information as the model number of the biological sample tube 202 in use or the diameter of the biological sample tube 202 using the touch panel as the input/output interface 707.

By determining the type of sample, for example, before biochemical analysis, a flag can be set in advance for a sample which may affect the accuracy of biochemical analysis, such as an abnormal serum (hemolysis, icterus, chyle). In addition, since the analyzing section 340 calculates the amount of solution in the detection object region 204, whether a sufficient amount of solution for analysis is available can be confirmed in advance and if the amount is insufficient, a remedial action such as collecting blood again can be taken, leading to improvement in the efficiency of biochemical analysis. Here, in the case of a biological sample tube 202 to which a colored label 203 similar to the color of the detection object region 204, for example, serum color yellow or red, is attached, if the color of the colored label 203 is extracted and checked against the data stored in the memory 705 or the like, the type of sample might be wrongly determined. Also, if the colored label 203 region is mistakenly extracted as the detection object region 204, the amount of solution may be miscalculated. Therefore, the colored label analyzing section 340 detects the colored label 203 and separates it from the color of the detection object region 204 and thereby prevents wrong determination of the sample type and miscalculation of the amount of solution which are caused by mistaking the colored label 204 as the object of detection, leading to improvement in the accuracy in the determination of the sample type and the accuracy in the measurement of the amount of solution.

<Details of Image Processing>

Figure 7:
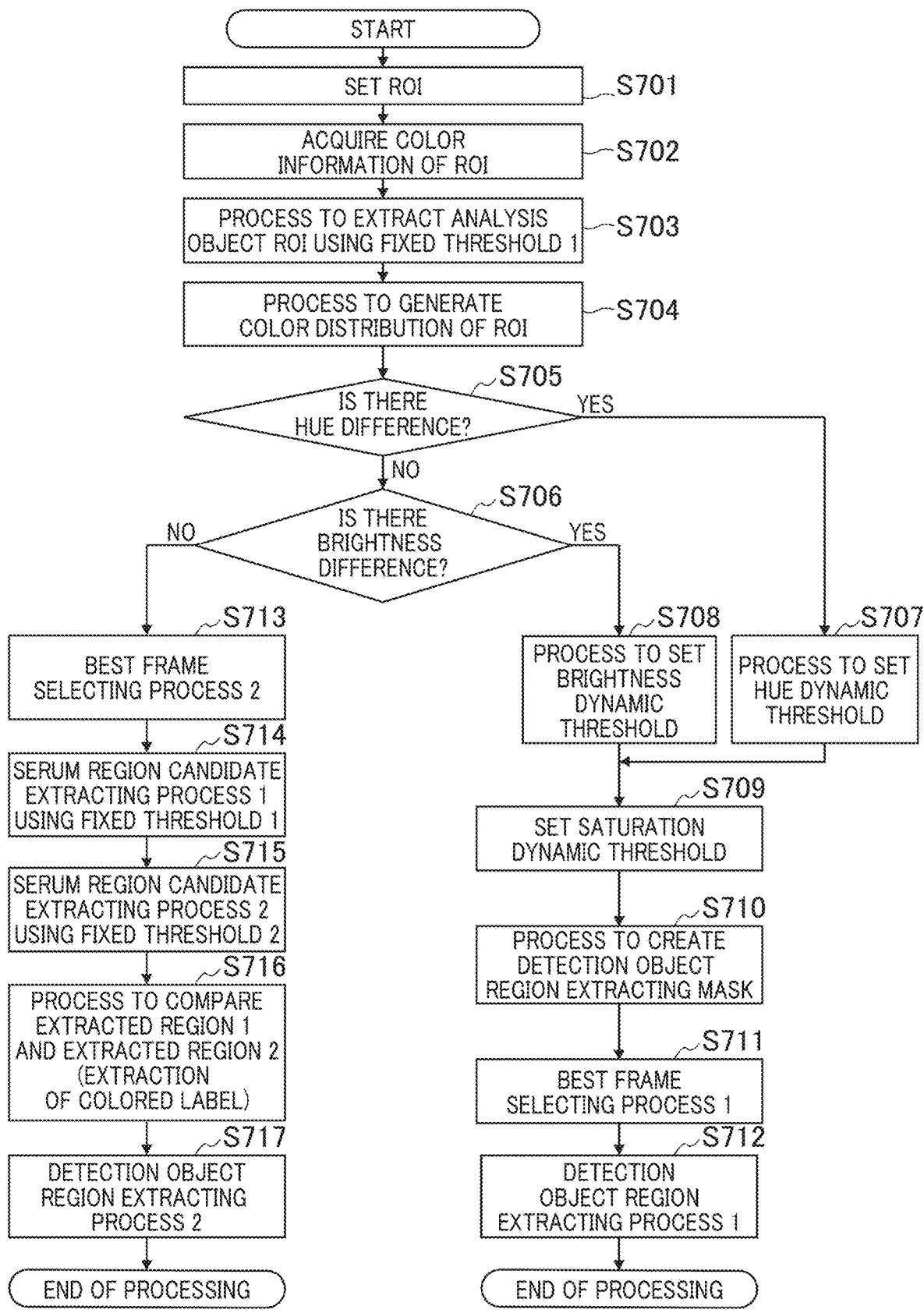
FIG. 7 is a flowchart which explains details of Step 502 (image processing) in FIG. 5.

FIG. 7 is a flowchart which explains details of Step 502 (image processing) in FIG. 5. In the explanation below, the subject of action for each step is assumed to be the processing section corresponding to the step. However, since each processing section is implemented by a program stored in the memory 705 or storage device 706, instead it may be interpreted that the subject of action for each step is the controller (processor) 704 as the subject which executes the program.

(i) Step 701

The region-of-interest setting section 220 sets a region of interest for each of the plural color images acquired at Step 501 in response to the settings for regions of interest (ROI) as entered by the user or the setting file stored in the memory 705 or storage device 706. The settings entered by the user or what is described in the setting file include, for example, information such as the number of ROIs, reference coordinate values in the image of each ROI, region size (the number of pixels in an ROI) and pitch for each ROI, as mentioned above. The sensitivity of detection of the colored label varies depending on the entered setting information. First, when the number of ROIs is increased in the long-side direction, the maximum detectable length (width in the long-side direction) of the colored label is longer, and when the ROI pitch in the long-side direction is decreased, the minimum detectable length (width in the long-side direction) of the colored label can be shortened. Also, when the number of ROIs in the short-side direction is increased and the pitch is decreased, for example, even if the rotation axis is unstable during rotation of the biological sample tube 202, the colored label can be detected and the minimum detectable width (width in the short-side direction) of the colored label can be decreased. Thus, when the number of regions of interest is larger, the detection sensitivity is higher, but if the number is too large, the processing speed (throughput) would be lowered. Therefore, depending on the length of the biological sample tube 202, for example, four to fifty regions of interest are set in the long-side direction of the biological sample tube 202 and, for example, one to five regions of interest are set in the short-side direction (for example, twenty or less in the long-side direction and three or less in the short-side direction). Furthermore, the set values can be altered for a relatively short biological sample tube 202.

Figure 8A:
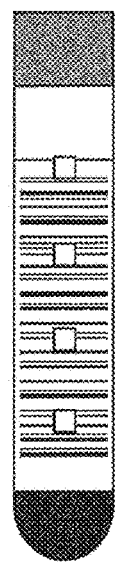
FIGS. 8A-8C are diagrams which show an example of setting of regions of interest.
Figure 8B:
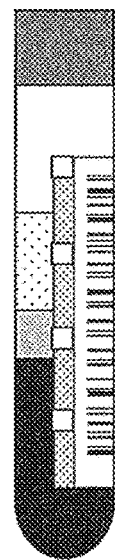
Figure 8C:
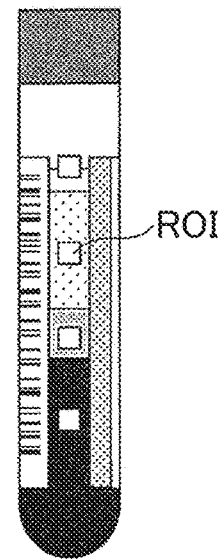

FIGS. 8A-8C are diagrams which show an example of setting of regions of interest. FIGS. 8A-8C show examples that for each acquired image, four regions of interest are set in the long-side direction and one region of interest is set in the short-side direction, though not limited thereto. As shown in FIGS. 8A-8C, regions of interest are set for each color image acquired at Step 501. Furthermore, FIGS. 8A-8C show that for example, regions of interest are set in a barcode portion of the label (FIG. 8A), a colored label portion (FIG. 8B), and a biological sample portion (FIG. 8C) including a detection object region 204 (for example, a serum region). In this embodiment, since 36 color images are acquired by rotating the biological sample tube 202, for example, 10 degrees each time, a plurality of regions of interest are set for each image as shown in FIG. 8A to FIG. 8C.

(ii) Step 702

The color information acquiring section 410 acquires at least information on hue (H), saturation (S), and brightness (V: Value) of each region of interest as set at Step 701.

(iii) Step 703

The analysis object region-of-interest extracting section 420 acquires fixed thresholds 1 for hue (H), saturation (S), and brightness (V: Value) from the memory 705 or storage device 706 and extracts the region of interest to be the object of analysis, from the plural set regions of interest according to the fixed thresholds. The fixed threshold 1 defines, for example, the range of HSV values (minimum and maximum values) which the object of detection (example: serum) can have (for example, red to yellow). If the color of the colored label is within the range of HSV values which the object of detection can have (for example, if the object of detection is a serum and the color of the colored label is red or yellow), the process to separate them (colored label analyzing process 1: Step 701 to Step 710) is performed. If the color of the colored label is not within the range of HSV values which the object of detection can have, the process to extract the colored label (for example, blue or green) (colored label analyzing process 2: Step 714 to Step 716) is separately performed.

Figure 9:
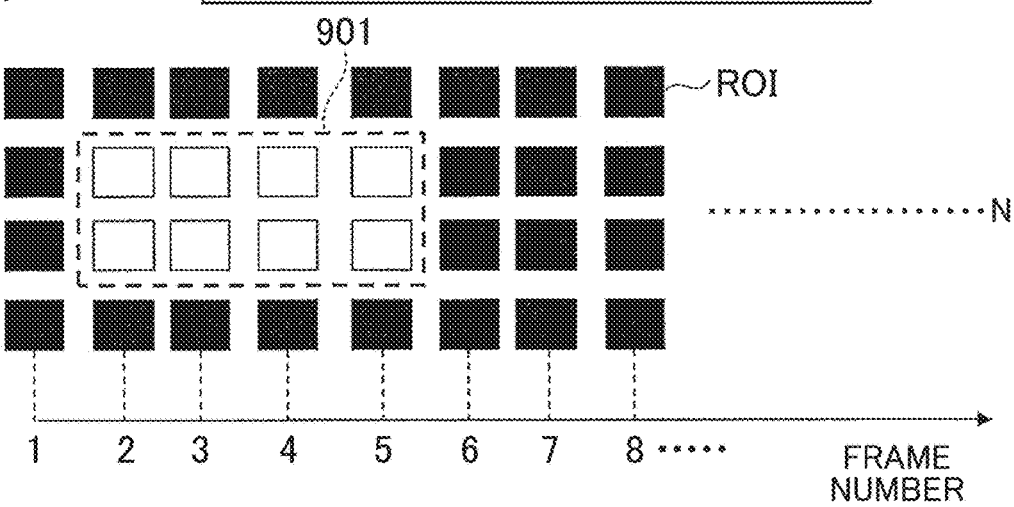
FIG. 9 is a diagram which shows the concept of extraction of regions of interest as the object of analysis using a fixed threshold 1.

FIG. 9 is a diagram which shows the concept of extraction of regions of interest as the object of analysis using the fixed threshold 1 (selection of the regions of interest to be analyzed, from a plurality of regions of interest). The pixels whose HSV value is within the range of the fixed threshold 1 are extracted by comparing the HSV value of each pixel in each set region of interest with the fixed threshold 1 and according to the number of extracted pixels, a region of interest as the object of analysis is extracted from the plural regions of interest by a method which will be described later. FIG. 9 shows that the regions of interest to be extracted as the object of analysis are shown in a region 901 and the regions of interest other than in the region 901 are not used for analysis. As a result of extracting the regions of interest in the region 901 as the analysis object regions of interest by comparison between the fixed threshold 1 and the HSV value of each pixel of a region of interest, the regions of interest corresponding to the region 901 are extracted as the detection object (for example, serum) regions or the regions of interest of the colored label as the object of analysis. Regions of interest which are included in a region other than the region 901 are not taken as the object of analysis since they are not within the color range of the fixed threshold 1.

FIG. 10 is a diagram which shows the difference between a region of interest to be analyzed and a region of interest not to be analyzed. In FIG. 10, each square region indicates a pixel in one region of interest. As a result of comparison between the HSV value of each pixel and the fixed threshold 1, a pixel whose HSV value is within the range of the fixed threshold 1 is indicated by white and a pixel whose HSV value is out of the range of the fixed threshold 1 is indicated by black. A region of interest whose ratio of white pixels (whose HSV value is within the range of the fixed threshold 1) is a prescribed value or more (for example, from 50% to 80% or more) is extracted as an object of analysis.

For example, if the detection object region 204 is a serum, since the color range which the detection object region 204 can have includes yellow for normal serum, red for hemolysis, and white for chyle and the color range which serum can have can be previously known to set a threshold. In addition, thresholds (fixed threshold 1, fixed threshold 2, hue dynamic threshold, brightness dynamic threshold, and saturation dynamic threshold) may be set in RGB color space or in HSV color space with hue, brightness (value) and saturation. In the case of a threshold in HSV color zone, after a color image is once converted into HSV color space, a candidate region for the detection object region 204 is extracted according to the set threshold. In addition, this threshold may be changed depending on the imaging environment such as the type of the biological sample tube 202 and the light intensity of the light sources 701a and 701b.

(iv) Step 704

The color distribution acquiring section 430 acquires the information on the hue, brightness (value), and saturation of each region of interest as set at Step 701 and generates a distribution (color distribution) of each of the elements (H, S, and V) for each image (frame). FIGS. 11A and 11B show the distribution of average brightness values in regions of interest when one region of interest is set for each image, as an example. When color images are taken along the whole circumference of the biological sample tube 202 by rotating the biological sample tube 202 10 degrees each time, 36 color images are obtained, so if one region of interest is set for each image, brightness information of 36 regions of interest is obtained and a distribution of average brightness values is generated. FIG. 11A shows a distribution before regions of interest as the object of analysis are extracted by the fixed threshold 1 as explained above and FIG. 11B shows a distribution after regions of interest as the object of analysis are limited by the fixed threshold 1. FIG. 12 is a diagram which shows a hue distribution range in the region of interest of each image. In the example of FIG. 12, a distribution after the hue range is limited by the fixed threshold 1 is shown.

(v) Step 705

The colored label presence determining section 440 determines whether or not there is a hue difference in the regions of interest as the object of analysis. For example, the colored label presence determining section 440 identifies the minimum and maximum values of hue in the regions of interest referring to the distribution of hue averages (FIG. 12) generated at Step 704 and determines whether or not "maximum hue value−minimum hue value" is larger than a prescribed threshold (threshold $TH_H$ to determine whether or not there is a hue difference). If it is determined that there is a hue difference (Yes at Step 705: when "maximum hue value−minimum hue value"≥$TH_H$, it is determined that there is a hue difference and a colored label with a color within the color range specified by the fixed threshold 1 is present), the process goes to Step S707. If it is determined that there is no hue difference (No at Step 705: when "maximum hue value−minimum hue value"<prescribed threshold, it is determined that there is no hue difference and a colored label within the range specified by the fixed threshold 1 is not present), the process goes to Step 706.

(vi) Step 706

The colored label presence determining section 440 determines whether there is a brightness difference in the regions of interest as the object of analysis. For example, the colored label presence determining section 440 identifies the minimum and maximum values of brightness in the regions of interest, referring to the distribution of brightness (value) averages (FIG. 11B: distribution after brightness regions are limited by the fixed threshold 1) generated at Step 704 and determines whether or not "maximum brightness value−minimum brightness value" is larger than a prescribed threshold (threshold $TH_{\_v}$ to determine whether or not there is a brightness difference). If it is determined that there is a brightness difference (Yes at Step 706: when "maximum brightness value−minimum brightness value"$\geq TH_{\_v}$, it is determined that there is a brightness difference and a colored label with a color within the color range specified by the fixed threshold 1 is present), the process goes to Step S708. If it is determined that there is no brightness difference (No at Step 706: when "maximum brightness value−minimum brightness value"<$TH_{\_v}$, it is determined that there is no brightness difference and a colored label with a color in the color range specified by the fixed threshold 1 is not present), the process goes to Step 713. Whether a colored label with a color out of the color range specified by the fixed threshold 1 (for example, blue or green if the object of detection is a serum) is present or not is determined by Step 713 and subsequent steps (colored label analyzing process 2).

(vii) Step 707

The dynamic threshold setting section 450 sets a new threshold for hue which is different from the fixed threshold 1. Specifically, when sample information on a plurality of biological sample tubes 202 is to be acquired, a hue threshold is dynamically set for each biological sample tube 202. A new threshold (dynamic threshold) can be set, for example, by (maximum hue value+minimum hue value)/2 or (maximum hue value+minimum hue value)/2+offset value. Specifically, in FIG. 12, the hue dynamic threshold is a value which divides the color range of hue as specified by the hue minimum value and maximum value of regions of interest. Here, since hue is generally expressed by a circle of 0 to 180 degrees or 0 to 360 degrees, it is necessary to determine whether the dynamic threshold is taken as the upper limit threshold for the fixed threshold 1 (the color range specified by the dynamic threshold is from the fixed threshold 1 to the dynamic threshold: Region 1) or the dynamic threshold is taken as the lower limit threshold (the color range specified by the dynamic threshold is from the dynamic threshold to the fixed threshold 1: Region 2) and determine to which region the hue range of the object of detection and the hue range of the colored label correspond. One possible method of determination is as follows: for example, if the object of detection is a serum, first, regions of interest as the object of analysis which have a hue corresponding to the hue range of each of the two regions are extracted and the brightness averages of the extracted regions of interest are calculated. The calculated brightness averages are compared and taking advantage of the tendency that serum is low in brightness and a colored label is high in brightness, the region with the higher brightness average is taken as the hue range of the colored label and the region with the lower brightness average is taken as the hue range of serum. As another method, if the area of the detection object region 204 and the area of the colored label are different and for example, the area of the colored label is conditioned to be smaller than the area of the detection object region 204, comparison is made in the number of regions of interest as the object of analysis which have a hue in the hue range of each of the two regions, the region with the larger number of regions of interest is taken as the detection object region 204. Alternatively, the user may enter the color information of the colored label to be used, for example, using the touch panel as the input/output interface 707 or the like and the hue range of the colored label may be determined from the acquired color information of the colored label. If it is determined at Step 705 that there is no hue difference, the hue threshold included in the fixed threshold 1 continues to be used.

(viii) Step 708

The dynamic threshold setting section 450 sets a new threshold for brightness which is different from the fixed threshold 1. Specifically, when sample information of a plurality of biological sample tubes 202 is to be acquired, a threshold for brightness is dynamically set for each biological sample tube 202. A new threshold (dynamic threshold) can be set, for example, by (maximum brightness value+minimum brightness value)/2 or (maximum brightness value+minimum brightness value)/2+prescribed offset value. If it is determined at Step 706 that there is no brightness difference, the brightness threshold included in the fixed threshold 1 continues to be used.

(ix) Step 709

The dynamic threshold setting section 450 calculates the saturation average or saturation minimum value in the regions of interest as the object of analysis and determines whether or not the saturation average or saturation minimum value is smaller than the fixed threshold 1 for saturation. If the saturation average or saturation minimum value is smaller than the fixed threshold 1, the dynamic threshold setting section 450 changes it to a predetermined fixed threshold $TH_{\_S2}$ which is smaller than the fixed threshold 1 (for example, a threshold which can separate a serum from a separating agent). If the saturation average or saturation minimum value is the fixed threshold 1 or larger, the fixed threshold 1 for saturation continues to be used as it is.

(x) Step 710

The colored label region removing section 460 generates a mask (detection object region 204 extracting mask) to extract the detection object region 204 from an image using the thresholds set at Step 707 to Step 709. The detection object region 204 extracting mask is a mask to extract only pixels whose hue are within the hue range specified by dynamic thresholds, and whose brightness values are smaller than the dynamic brightness threshold, and whose saturation value is equal to or larger than the fixed threshold $TH_{\_S2}$ or equal to or larger than the fixed threshold 1

FIGS. 13A-13C are diagrams which show an example of the detection object region 204 extracting mask (serum region extracting mask). FIG. 13A shows an image of a best frame which will be described later. FIG. 13B shows a mask without a colored label removing function and FIG. 13C shows a mask with a colored label removing function. For example, the mask shown in FIG. 13B only limits the range of HSV values which are allowed by the fixed threshold 1. Therefore, when the mask in FIG. 13C is applied to the image of the best frame, the detection object region 204 can be directly extracted. Specifically, when the color within the preset threshold range is extracted as a candidate region for the detection object region 204 using the color space thresholds, if the color of the colored label region is within the color range for extraction of a candidate region for the detection object region 204 (when only the fixed threshold 1 is used), as shown in FIG. 13B, both the colored label region and the detection object region 204 would be extracted by the color space thresholds and it would be impossible to discriminate between the color of the colored label region and the color of the detection object region 204 and extract only the detection object region 204. On the other hand, when the mask in FIG. 13C is applied to the image of the best frame, not only the problem with the use of the mask in FIG. 13B can be solved, but also the colored label region can also be extracted using the information of the extracted detection object region 204. If the colored label region can be extracted, even when the detection object region 204 is extracted by edge extraction or the like other than the method of extracting the detection object region 204 using the above mask, the colored label region can be previously removed from the image as the object of analysis, thereby preventing a deterioration in the detection accuracy which may be caused by mistakenly extracting the colored label. Furthermore, when the test item or sample type is identified by label color, the information on these can be acquired by extracting the color of the colored label.

(xi) Step 711

The label extracting section 320 selects the image with the largest area of the detection object region 204 among the plural color images acquired at Step 501, as a best frame (best frame selecting process 1). For example, the label extracting section 320 calculates the area of the detection object region 204 of the color images from which the colored label region has been removed, using the detection object region extracting mask generated at Step 710 and takes the image with the largest area as the best frame. FIGS. 14A-14G are diagrams which show the relation between the imaging direction of the blood collection tube (biological sample tube 202) and the serum extraction region area (detection object region 204 area). FIG. 14A to FIG. 14F are views which show the orientation of the biological sample tube 202 at the time of imaging (imaging direction) and FIG. 14G is a diagram which shows the area of the detection object region 204 which corresponds to them. As shown in FIG. 14G, the area of the detection object region 204 changes (increases) according to the rotation angle of the biological sample tube 202. If the colored label region is not removed, the colored label region would be mistakenly detected as the detection object region 204 and the image in FIG. 14E would be selected as the best frame (the area of the detection object region 204 is the largest). On the other hand, if the colored label region is removed, the image in FIG. 14D is selected as the best frame.

(xii) Step 712

The detection object region extracting section 330 applies the detection object region 204 extracting mask generated at Step 710 to the image selected as the best frame at Step 711, separates the detection object region 204 and the colored label region 205 and stores the information of each of the regions in the memory 705 or storage device 706.

(xiii) Step 713

The label extracting section 320 selects a best frame from among the acquired color images using the fixed threshold 1. If it is determined at Step 706 that there is no brightness difference, a colored label having a color within the range defined by the fixed threshold 1 (for example, from yellow to red: color similar to the color of the detection object region 204) is not present on the biological sample tube 202. Therefore, by applying the detection object region extracting mask based on the fixed threshold 1 (FIG. 13B), the detection object region 204 in this case can be extracted. Accordingly, the image whose area is the largest can be selected as the best frame simply by comparison in the size of the region limited by the fixed threshold 1.

(xiv) Step 714

The label extracting section 320 applies the fixed threshold 1 for each of hue, brightness and saturation to the best frame image selected at Step 713 and extracts a detection object region candidate 1.

(xv) Step 715

The label extracting section 320 applies a fixed threshold 2 to the best frame image selected at Step 713 and extracts a detection object region candidate 2. Here, the fixed threshold 2 is the same value as the fixed threshold 1 for brightness and saturation and acquires all values for hue.

(xvi) Step 716

The colored label presence determining section 440 determines whether a colored label region is present or not, by comparing the detection object region candidate 1 extracted at Step 714 and the detection object region candidate 2 extracted at Step 715, and if it determines that a colored label region is present, extracts the colored label region. The information of the extracted colored label region is stored in the memory 705 or storage device 706.

Then, the colored label region removing section 460 removes the colored label region from the image selected as the best frame at Step 713.

(xvii) Step 717

The detection object region extracting section 330 performs a detection object region 204 process other than the detection object region 204 extracting mask, such as an edge detection process, on the image from which the colored label region has been removed at Step 716. For example, by identifying the edge of each region, the detection object region 204 and a region such as a separating agent are separated to extract the detection object region 204.

<Variations>

(1) Variation 1: Image Processing

Figure 15A:
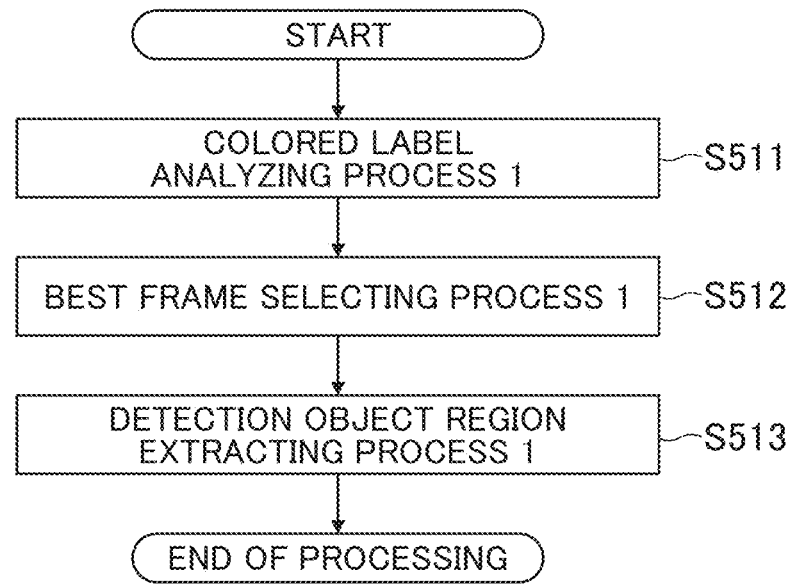
FIGS. 15A-15B are diagrams which show examples of setting of regions of interest in a variation.
Figure 15B:
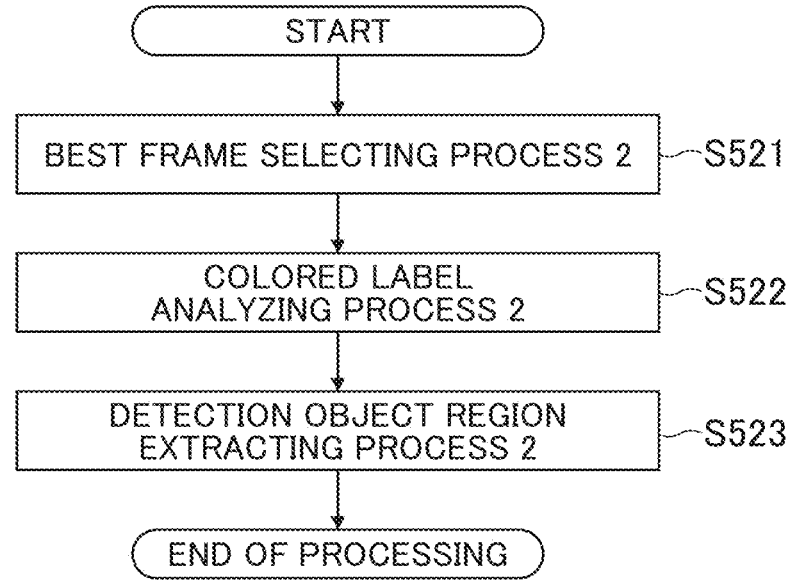

FIGS. 15A and 15B are diagrams which show a variation of image processing performed in the biological sample detection device 100 according to this embodiment. In this variation, if the color information of the colored label attached to the biological sample tube 202 is entered by the user (operator), image processing A (see FIG. 15A) or image processing B (FIG. 15B) is performed depending on the entered color information instead of performing the image processing in FIG. 7.

In FIG. 15A, the colored label analyzing process 1 at Step 511 corresponds to Step 701 to Step 710 in FIG. 7, the best frame selecting process 1 at Step 512 corresponds to Step 711 in FIG. 7, and the detection object region extracting process 1 at Step 513 corresponds to Step 712 in FIG. 7. On the other hand, in FIG. 15B, the best frame selecting process 2 at Step 521 corresponds to Step 713 in FIG. 7, the colored label analyzing process 2 at Step 522 corresponds to Step 714 to Step 716 in FIG. 7, and the detection object region extracting process 2 at Step 523 corresponds to Step 717 in FIG. 7.

(2) Variation 2: Examples of Setting of Regions of Interest

Figure 16A:
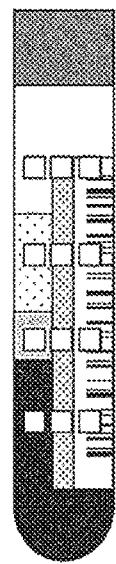
FIGS. 16A-16C are diagrams which show a variation of image processing which is performed in the biological sample detection device 100 in this embodiment.
Figure 16B:
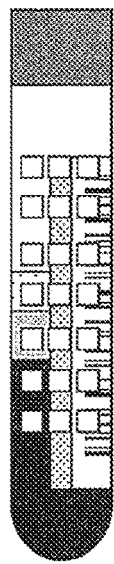
Figure 16C:
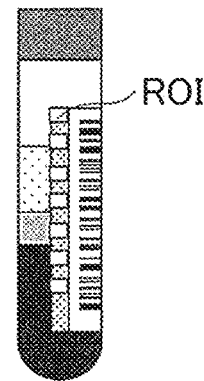

FIGS. 16A-16C are diagrams which show examples of setting of regions of interest. As shown in FIGS. 16A and 16B, the number of regions of interest which are set can be changed as appropriate for each biological sample tube 202 through the region-of-interest setting section 220 by the user using the input/output interface 707. In addition, even if the length of the biological sample tube 202 is short, the number of regions of interest can be set as appropriate (adjusted according to the length of the biological sample tube 202). Alternatively, several region-of-interest setting patterns, such as a region-of-interest setting pattern for a short biological sample tube and a region-of-interest setting pattern for a long biological sample tube, can be stored in the memory 705 or storage device 706 in advance so that a setting pattern is read in response to the type of biological sample tube or test item which is entered by the user.

<Conclusion>

(i) The biological sample detection device according to this embodiment performs: the colored label presence determining process to acquire a color image of a biological sample tube (for example, a plurality of frames) and determine whether or not a colored label is present on the biological sample tube, according to the color information (hue, brightness, saturation); the label extracting process to extract the colored label determined to be present by the colored label presence determining process, from the color image; the detection object region extracting process to remove the colored label from the color image and extract the detection object region in the biological sample; and the analyzing process to acquire the color information of the detection object region and analyze the type of the biological sample and the amount of solution. Since the colored label attached to the biological sample tube is identified and removed in this way, the colored label and the detection object region (for example, a serum region) can be separated with high accuracy and the sample included in the detection object region can be analyzed.

(ii) Furthermore, the biological sample detection device according to this embodiment performs the analysis object region-of-interest extracting process to extract a region of interest whose color information is within a prescribed range defined by a fixed threshold, as an analysis object region of interest, and in the colored label presence determining process, determines whether a colored label region is included in the analysis object region of interest, using the hue or brightness information of the analysis object region of interest. More specifically, in the colored label presence determining process, the biological sample detection device acquires the distributions of variation of hue and brightness in the analysis object region of interest and determines whether a colored label is present or not, according to the brightness or hue distribution (for example, width of hue variation (difference between maximum and minimum values) or width of brightness variation (difference between maximum and minimum values)). By doing so, when the color of the colored label region and the color of the detection object region can be within the same color range (when the colored label is yellow and the detection object region (serum region) is yellowish or reddish or when the colored label is red and the detection object region is yellowish or reddish), the colored label and the detection object region can be separated accurately.

(iii) The biological sample detection device according to this embodiment performs the process to dynamically set a threshold to remove a colored label from a color image and extract a detection object region, for each biological sample tube. More specifically, the biological sample detection device extracts the maximum and minimum values of hue and the maximum and minimum values of brightness from the distribution of hue variation and distribution of brightness variation of the analysis object region of interest and sets a hue dynamic threshold and a brightness dynamic threshold to extract the detection object region, using these maximum and minimum values. For example, a dynamic threshold can be set by calculating (maximum value+minimum value)/2 or (maximum value+minimum value)/2+offset value. On the other hand, a saturation dynamic threshold is set according to the magnitude relation (example) between the saturation value (average saturation value or minimum saturation value) of the analysis object region of interest and the fixed threshold 1 for saturation. For example, if the average saturation value or minimum saturation value is smaller than the fixed threshold 1, a fixed threshold 2 prepared in advance and smaller than the average saturation value, for example, a fixed threshold 2 set so as to enable separation of a separating agent and a serum can be set. If the average saturation value is the fixed threshold 1 or larger, the fixed threshold 1 is used as it is. A mask for extracting a detection object region (detection object region extracting mask) is generated using these three dynamic thresholds. Since thresholds are dynamically set in this way, optimum thresholds can be set as appropriate depending on the relative relation between the color of the colored label region and the color of the detection object region and both can be separated accurately.

(iv) The biological sample detection device according to this embodiment calculates the area of the detection object region obtained by removing the colored label region in a plurality of frames of color images, using the detection object region extracting mask, takes the image in which the area is the largest, as a best frame (see FIGS. 14A-14G) and performs the analyzing process on the detection object region as the best frame. In this embodiment, since the possibility of mixing up the colored label and the detection object region is eliminated, the best frame (real best frame) whose area (area in the color image) of the detection object region is the largest can be selected as the object of analysis and thus a more accurate analysis result can be expected.

(v) The functions of this embodiment can also be implemented by a software program code. In this case, the storage medium which records the program code is supplied to a system or device and the computer (or CPU or MPU) of the system or device reads the program code stored in the storage medium. In this case, the program code itself read from the storage medium implements the functions of the abovementioned embodiment and the program code itself and the storage medium which stores it constitute the present disclosure. As the storage medium to supply such a program code, for example, a flexible disk, CD-ROM, DVD-ROM, hard disk, optical disk, magnetooptical disk, CD-R, magnetic tape, nonvolatile memory card, ROM or the like is used.

In addition, according to an instruction of the program code, the OS (operating system) or the like which runs on the computer may perform part or all of actual processing so that the functions of the abovementioned embodiment are realized by the processing. Furthermore, after the program code read from the storage medium is written in the memory of the computer, according to an instruction of the program code, the CPU of the computer or the like may perform part or all of actual processing so that the functions of the abovementioned embodiment are realized by the processing.

Furthermore, the software program code to implement the functions of the embodiment may be delivered through a network and stored in storage means such as the hard disk or memory of the system or device or in a storage medium such as a CD-RW or CD-R, so that at the time of use, the computer (or CPU or MPU) of the system or device reads the program code stored in the storage means or the storage medium to perform the functions.

In the abovementioned embodiment, the control lines and data lines are the ones considered as required for explanation and do not always cover all the control lines and data lines in the product. All constituent elements may be connected to each other.

LIST OF REFERENCE SIGNS

100 . . . biological sample detection device,
201 . . . imaging section,
202 . . . biological sample tube,
203 . . . colored label,
204 . . . detection object region,
205 . . . colored label region,
404 . . . background plate,
701a, 701b . . . light source,
702a, 702b . . . light source driver,
703 . . . biological sample tube holder,
704 . . . controller,
705 . . . memory,
706 . . . storage device,
707 . . . input/output interface,
708 . . . data bus,
1001 . . . gripping mechanism,
1002 . . . moving mechanism,
1003 . . . vertical control driver,
1004 . . . rotating mechanism,
1005 . . . rotation control driver

The invention claimed is:

1. A biological sample detection device which analyzes a biological sample housed in a biological sample tube to which a colored label is attached, comprising:
an imaging device which takes and outputs a color image of the biological sample tube;
a storage device which stores a program to perform prescribed image processing on the color image; and
a processor which reads the program from the storage device and performs the prescribed image processing, wherein the processor configured to perform:
a colored label presence determining process to determine whether or not a colored label is present on the biological sample tube, according to color information of the color image;
a label extracting process to extract the colored label determined to be present by the colored label presence determining process, from the color image;
a detection object region extracting process to remove the colored label from the color image and to extract a detection object; and
an analyzing process to acquire color information of the detection object region and to analyze a liquid amount and type of the biological sample,
wherein the imaging device is further configured to acquire and output a plurality of frames of color images of the biological sample tube,
wherein the processor is further configured to set a plurality of regions of interest each having a specified pixel size for each of the plurality of frames of color images, and to perform a color information acquiring process to acquire color information including information on brightness, hue, and saturation as the color information of each region of interest, and
wherein at least one of the plurality of regions of interest is set within the colored label, and at least one of the plurality of regions of interest is set within the detection object region.

2. The biological sample detection device according to claim 1, wherein
the processor performs an analysis object region-of-interest extracting process to extract the region of interest, the color information of which is within a prescribed range defined by a fixed threshold, as an analysis object region of interest, and
in the colored label presence determining process, the processor determines whether the analysis object region of interest includes a region of the colored label, using hue or brightness information of the analysis object region of interest.

3. The biological sample detection device according to claim 2, wherein in the colored label presence determining process, the processor acquires distributions of variation of the hue and the brightness of the analysis object region of interest and determines whether the colored label is present or not, according to the distribution of the brightness or the hue.

4. The biological sample detection device according to claim 3, wherein in the colored label presence determining process, the processor determines whether the colored label is present or not, according to width of variation of the hue or width of variation of the brightness in the analysis object region of interest.

5. The biological sample detection device according to claim 4, wherein the processor performs a process to remove the colored label from the color image and dynamically set a threshold to extract the detection object region, for each of the biological sample tube.

6. The biological sample detection device according to claim 5, wherein the processor extracts maximum and minimum values of the hue and maximum and minimum values of the brightness from the distribution of variation of the hue and the distribution of variation of the brightness and sets a hue dynamic threshold or a brightness dynamic threshold to extract the detection object region using these maximum and minimum values.

7. The biological sample detection device according to claim 6, wherein the processor furthermore sets a saturation dynamic threshold according to a relation between a saturation value of the analysis object region of interest and the fixed threshold for saturation.

8. The biological sample detection device according to claim 7, wherein the processor generates a mask to extract the detection object region using the hue dynamic threshold, the brightness dynamic threshold, and the saturation dynamic threshold.

9. The biological sample detection device according to claim 8, wherein the processor calculates an area of the detection object region obtained by removing the region of the colored label, in the plural frames of color images, using the mask, takes an image in which the area is the largest, as a best frame and performs the analyzing process on the best frame.

10. The biological sample detection device according to claim 1, wherein the processor sets the plurality of the regions of interest in a long-side direction of the biological sample tube.

11. The biological sample detection device according to claim 10, wherein the processor sets the plurality of the regions of interest in a short-side direction of the biological sample tube.

12. The biological sample detection device according to claim 11, wherein the processor performs a process to change the number of the regions of interest in the long-side direction and/or the short-side direction in response to an entered instruction.

13. The biological sample detection device according to claim 11, wherein the processor performs a process to change a size of the region of interest in response to an entered instruction.

* * * * *